May 23, 1939.　　　P. A. VOLLMER　　　2,159,188
ADJUSTABLE SADDLE SUPPORT
Filed March 11, 1937
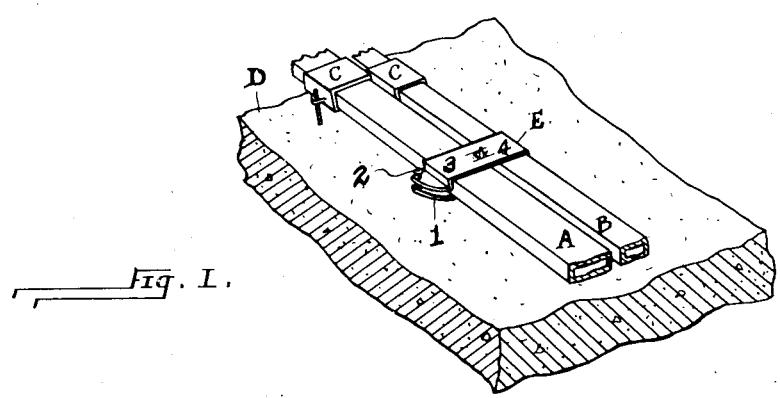
Fig. I.
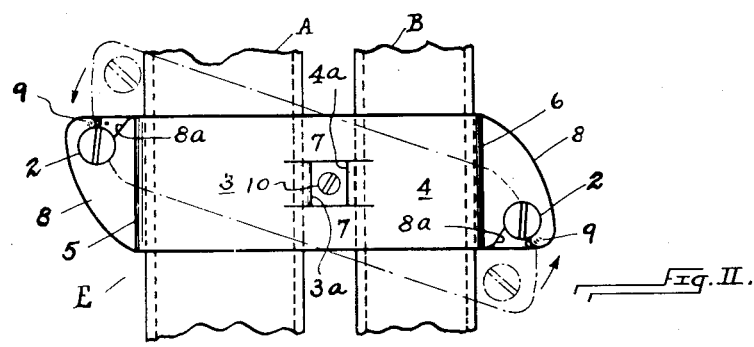
Fig. II.
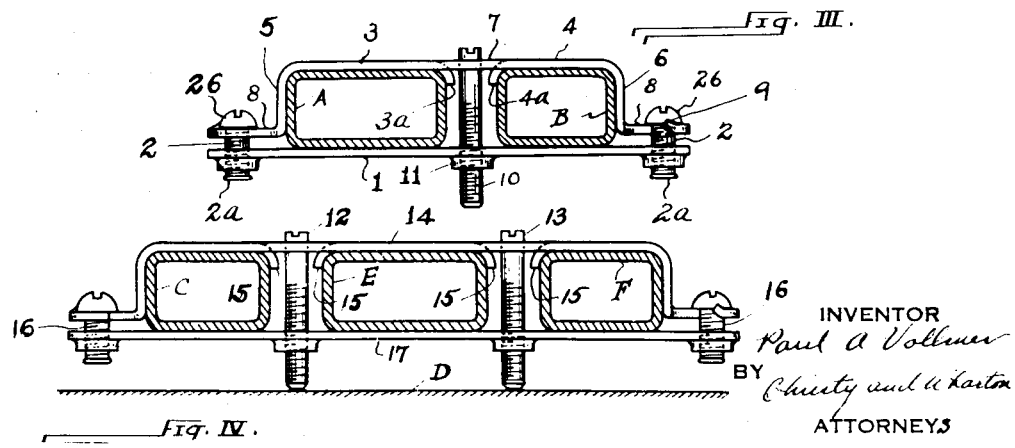
Fig. III.
Fig. IV.
INVENTOR
Paul A. Vollmer
BY
Christy and Christy
ATTORNEYS Patented May 23, 1939

2,159,188

UNITED STATES PATENT OFFICE 2,159,188

ADJUSTABLE SADDLE SUPPORT

Paul A. Vollmer, Rochester, Pa., assignor to National Electric Products Corporation, a corporation of Delaware Application March 11, 1937, Serial No. 130,352

3 Claims. (Cl. 248—49)

This invention relates to a saddle support for underfloor duct.

In installation of underfloor duct for electrical wiring it is necessary to provide supporting means for the duct beneath the level of the floor which is to enclose or overlie the duct. The supporting means for the duct should be of sufficient rigidity definitely to space the duct with respect to the level of the underlying floor structure, and it is desirable that the supporting means be of such nature that it permits choice in the vertical spacing of the duct.

With the problems relating to the installation of underfloor duct in mind, I have invented a duct support which is capable of rigidly supporting the duct at intervals along its length, which support is simple in structure, comprises a minimum of separate elements, which can readily be applied to the duct in installation, and which provides readily adjustable means defining the lowermost position of the duct with respect to the level of a floor which is to be formed around and above the duct. Assuming that duplicate lengths of underfloor duct are supported terminally in usual manner by structures providing for the introduction and eduction of electrical conductors, the problem is to so support the lengths of duct intermediately that the duct is prevented from sagging and is supported against undue strain upon these widely separated primary points of attachment. It is this support which my saddle is, with improved simplicity and utility, designed to provide.

In the accompanying drawing Fig. I is a plan view illustrating the positioning of two lengths of underfloor duct, and illustrating the mounting of the duct in the structure which is to lie below the floor level.

Fig. II is a fragmentary plan view on an enlarged scale of the duct lengths in a region in which a saddle support is applied.

Fig. III is a cross-sectional view, on the scale of Fig. II, taken through a saddle support and showing the engagement of duct lengths by a saddle.

Fig. IV is a cross-sectional view through a saddle support and duct lengths supported thereby, showing the support of three parallel lengths of duct by the saddle.

In the drawing the lengths of underfloor duct are designated by reference letters A and B, and are shown as terminally connected in boxes C in a position spaced vertically from an underlying structure D. Saddle supports are arranged at intervals along the length of the ducts, one such support being shown and designated generically by reference letter E.

Referring now specifically to the saddle structure, as illustrated in detail in Figs. II and III, it is seen that the saddle support comprises a basal element 1 upon which the ducts A and B rest. As shown, the ducts A and B are of unequal size, it being thus illustrated that the saddle support may be initially constructed to support two ducts of unequal size, as well as to support duct lengths of equal cross-sectional dimensions. Carried by the basal element 1 are connecting screws 2, which screws are threaded through the base, and are desirably so upset adjacent their lower extremities at 2a that they cannot in their normal use be withdrawn from the base. Cooperative with the basal element 1 is an embracing element, arranged to engage the duct lengths in definite position on the basal element.

A preferred form of this embracing element comprises, as shown, roof portions 3 and 4 arranged respectively to overlie the ducts A and B, these roof portions 3 and 4 being continued downwardly as dependent wall portions 5 and 6 lying against the side walls of the two ducts. Roof portions 3 and 4 of the embracing element are interconnected by straps 7, which integrate them into a unitary element, and which leave an open space therebetween. As shown, each of the roof portions 3 and 4 of the embracing element has respectively dependent flanges 3a and 4a positioned to both sides of the bridge portion 7 and arranged to lie against those walls of the ducts A and B which face each other in assembly. With the duct lengths A and B engaged by the saddle assembly, as shown, the ducts are thus laterally confined between the dependent wall portions 5 and 6 and the flanges 3a and 4a.

The basal element 1 and the cover element are detachably interconnected in a manner which provides for their ready interengagement in position to clamp ducts between them, and which is capable of simple and efficient tightening action firmly to engage the ducts. To this end the connecting screws 2, carried by the basal element 1, and held against removal from the basal element by their upset regions, are so arranged that the heads 26 of the screws lie above feet 8 which are projected laterally from the side portions 5 and 6 of the embracing element when the shanks of the screws are caused to enter oppositely inclined slots 8a, formed in the feet 8 of the embracing element.

As shown, the slots 8a are tangential to an axis about which basal element 1 may be rotated in making assembly, so that the shanks of the screws 2 simultaneously enter the two slots to embrace the feet 8 between the basal element and the heads of the screws. By simply running down the screws 2 the ducts A and B are then closely and firmly engaged by the saddle assembly. Desirably, the two saddle elements are of sheet metal of such gauge that they possess some degree of resiliency the more securely to engage the ducts. As shown, upturned lips 9 arranged at the edges of the slots 8a tend to prevent disengagement of the basal element and the duct-embracing element of the saddle should the connecting screws become loosened.

The assembly is adapted for mounting in vertically adjusted position by means of a mounting screw 10, which passes through the opening between the straps 7 of the embracing element, and is threaded in a boss 11 of the basal element. Screw 10, by projecting a suitable distance to bear against the underlying structure D, serves to support the saddle assembly and the ducts embraced by it in a position spaced a regulated vertical distance from the underlying structure.

Fig. IV of the drawings shows a modification in which the base structure 17 is arranged to support three parallel duct lengths C, E, and F, and is provided with two adjusting screws 12 and 13. Both these adjusting screws 12 and 13 are mounted directly in the base 17 to project a regulable distance separated from each other a portion only of the length of the duct-carrying base. As will be hereinafter explained, this form of mounting and spacing of the adjusting screws facilitates the adjustment by which the saddle supports may be caused to push up against the ducts firmly and regulably to define the plane in which they lie.

Desirably, the embracing structure 14 of the saddle support accords generally with the corresponding structure shown in Figs. I, II, and III. Thus it comprises openings for the upward projection of the kerfed upper ends of screws 12 and 13, and these openings are bordered by duct-embracing flanges 15. Interconnection of the base and embracing elements is effected by connecting screws 16 similar to the connecting screws 2 of the structure shown in Figs. I, II, and III.

It is to be understood that the showing of the drawing is exemplary of a saddle support formed in accordance with the principles of the present invention. When desirable, the saddle support may be arranged to embrace and mount any desired number of ducts. Other modifications in structure and arrangement may conceivably be made without departing from the spirit of the invention which is herein fundamentally disclosed.

Whereas it is preferable that the duct, or ducts, be held to the base by some structure, such as the sheet metal plate shown, it is possible to tie the ducts to the vertically adjustable base by simpler means, such as the tie wires commonly used for the purpose.

Advantages attributable to my invention are found in the ease with which the saddle assembly may be applied in vertically adjusted position at any time prior to the pouring of concrete to form the floor; in the firmness with which the saddle engages the ducts; in the relatively great rigidity with which it supports them; and in the fact that the attaching screws are capable of spacing the supports adjustably from an underlying floor structure.

The primary advantage of my saddle support is, however, that it provides simplicity in adjustment. Since the single adjusting screw 10 of Figs. I to III is mounted directly in the base 1 intermediate the length of the saddle support, a single operation is sufficient to adjust each to push up against the duct, or ducts, supported by it from the underlying floor structure. It thus presents great advantage over structures in which adjustment must be made at opposite points spaced by the length of the saddle, since in the latter case the adjustments must be correlated with each other, by a series of relatively slight adjusting movements performed alternately on both the spaced adjusting elements. Even though two adjusting screws are shown in Fig. IV, the operation of effecting adjustment by means of them is relatively simple. This is because they are both mounted within the length of the duct-supporting base, and directly in the base, so that it is not difficult so to adjust both of them each with respect to the other that they provide uniformly spaced mounting for the base.

It is, therefore, in installation a simple matter accurately to adjust the height at which the ducts are positively supported.

I have found it preferable, however, to utilize but a single adjusting screw as shown in Figs. I to III, rather than a plurality of adjusting screws as shown in Fig. IV, even though three or more duct lengths are supported by the saddle base, save when the length of the saddle is so great as to render the use of a single spacing screw undesirable.

I claim as my invention:

1. A saddle support for application intermediate the length of at least one underfloor duct for electrical conductors comprising in assembly a basal element and an opposed clamping element formed and arranged cooperatively with said basal element embracingly to engage at least one such duct, connecting means effective adjacent both ends of the cooperative assembly of the basal element and its opposed clamping element adapted firmly to interconnect the said elements in duct engaging relation, and an adjusting element independent of the connecting means mounted intermediate the length of said elements and between the regions of their interconnection and mounted regulably to project beneath the said basal element regulably to space the assembly as a whole from an underlying floor structure.

2. A saddle support in accordance with the definition of claim 1 in which the interconnecting means of the assembly comprise headed members and slots carried in cooperative apposition by the basal element and its opposed clamping element and adapted to be brought into operative relation by rotation of one of the said elements in a plane parallel to the general plane of the other of said elements.

3. A saddle support for application intermediate the length of an underfloor duct for electrical conductors comprising in assembly a basal element and an opposed clamping element formed and arranged cooperatively with said basal element embracingly to engage the duct, interconnecting means between the said basal element and the said clamping element comprising headed members and slots carried in cooperative apposition by the basal element and its opposed clamping element, and adapted to be brought into operative relation by rotation of one of the said elements in a plane parallel to the general plane of the other of said elements, and an adjusting element independent of said interconnecting means mounted regulably to project beneath the said basal element regulably to space the assembly from an underlying floor structure.

PAUL A. VOLLMER.